(12) United States Patent
Yevmenkin et al.

(10) Patent No.: US 11,323,510 B2
(45) Date of Patent: *May 3, 2022

(54) LOAD-BALANCING CLUSTER

(71) Applicant: Level 3 Communications, LLC, Broomfield, CO (US)

(72) Inventors: Maksim Yevmenkin, Thousand Oaks, CA (US); David Fullagar, Boulder, CO (US); Christopher Newton, Westlake Village, CA (US); Jeffrey Koller, Oxnard, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 3 days.

This patent is subject to a terminal disclaimer.

(21) Appl. No.: 16/987,462

(22) Filed: Aug. 7, 2020

(65) Prior Publication Data

US 2020/0366730 A1 Nov. 19, 2020

Related U.S. Application Data

(63) Continuation of application No. 14/948,267, filed on Nov. 21, 2015, now Pat. No. 10,742,723, which is a
(Continued)

(51) Int. Cl.
*G06F 15/173* (2006.01)
*H04L 67/101* (2022.01)
(Continued)

(52) U.S. Cl.
CPC ...... *H04L 67/101* (2013.01); *H04L 29/12405* (2013.01); *H04L 61/2007* (2013.01);
(Continued)

(58) Field of Classification Search
CPC .............. H04L 67/101; H04L 67/2842; H04L 67/1068; H04L 61/2007; H04L 67/02;
(Continued)

(56) References Cited

U.S. PATENT DOCUMENTS 6,108,703 A 8/2000 Leighton et al.
6,128,279 A * 10/2000 O'Neil ................ H04L 67/1017
370/402
(Continued)

OTHER PUBLICATIONS

Canada Examination Report, dated Oct. 31, 2012, Application No. 2716818, 3pgs.
(Continued)

*Primary Examiner* — Suraj M Joshi
*Assistant Examiner* — Jaren Means

(57) ABSTRACT

A load-balancing cluster includes a switch having a plurality of ports; and a plurality of servers connected to at least some of the plurality of ports of the switch. Each server is addressable by the same virtual Internet Protocol (VIP) address. Each server in the cluster has a mechanism constructed and adapted to respond to connection requests at the VIP by selecting one of the plurality of servers to handle that connection, wherein the selecting is based, at least in part, on a given function of information used to request the connection; and a firewall mechanism constructed and adapted to accept all requests for the VIP address for a particular connection only on the server that has been selected to handle that particular connection. The selected server determines whether it is responsible for the request and may hand it off to another cluster member.

16 Claims, 8 Drawing Sheets

Related U.S. Application Data continuation of application No. 14/537,773, filed on Nov. 10, 2014, now Pat. No. 9,197,699, which is a continuation of application No. 13/899,476, filed on May 21, 2013, now Pat. No. 8,886,814, which is a continuation of application No. 12/880,313, filed on Sep. 13, 2010, now Pat. No. 8,489,750, which is a continuation-in-part of application No. 12/390,560, filed on Feb. 23, 2009, now Pat. No. 8,015,298.

(60) Provisional application No. 61/064,339, filed on Feb. 28, 2008.

(51) Int. Cl.
| H04L 61/2521 | (2022.01) |
| H04L 67/1023 | (2022.01) |
| H04L 67/568 | (2022.01) |
| H04L 67/1061 | (2022.01) |
| H04L 67/1001 | (2022.01) |
| H04L 67/141 | (2022.01) |
| H04L 61/5007 | (2022.01) |
| H04L 67/02 | (2022.01) |
| H04L 67/1036 | (2022.01) |
| H04L 69/326 | (2022.01) |
| H04L 67/1014 | (2022.01) |

(52) U.S. Cl.
CPC ......... *H04L 61/2528* (2013.01); *H04L 67/02* (2013.01); *H04L 67/1002* (2013.01); *H04L 67/1023* (2013.01); *H04L 67/1036* (2013.01); *H04L 67/1068* (2013.01); *H04L 67/141* (2013.01); *H04L 67/2842* (2013.01); *H04L 69/326* (2013.01); *H04L 67/1014* (2013.01)

(58) Field of Classification Search
CPC . H04L 67/1036; H04L 69/326; H04L 67/141; H04L 67/1023; H04L 67/1002; H04L 29/12405; H04L 61/2528; H04L 67/1014
See application file for complete search history.

(56) References Cited

U.S. PATENT DOCUMENTS

| 6,167,438 | A | * | 12/2000 | Yates | ................... H04L 67/2814 |
| | | | | | 709/216 |
| 6,430,618 | B1 | | 8/2002 | Karger et al. | |
| 6,463,454 | B1 | | 10/2002 | Lumelsky et al. | |
| 6,470,389 | B1 | | 10/2002 | Chung et al. | |
| 6,553,413 | B1 | | 4/2003 | Leighton et al. | |
| 6,553,420 | B1 | | 4/2003 | Karger et al. | |
| 6,578,066 | B1 | | 6/2003 | Logan et al. | |
| 6,601,101 | B1 | * | 7/2003 | Lee | ..................... H04L 67/1017 |
| | | | | | 709/227 |
| 6,826,613 | B1 | | 11/2004 | Wang et al. | |
| 6,888,797 | B1 | | 5/2005 | Cao et al. | |
| 6,954,784 | B2 | | 10/2005 | Aiken et al. | |
| 7,127,513 | B2 | | 10/2006 | Karger et al. | |
| 7,181,524 | B1 | | 3/2007 | Lele | |
| 7,240,100 | B1 | | 7/2007 | Wein et al. | |
| 7,912,954 | B1 | | 3/2011 | Oesterreicher et al. | |
| 9,055,076 | B1 | | 6/2015 | Sorenson et al. | |
| 2002/0010783 | A1 | | 1/2002 | Primak et al. | |
| 2002/0010798 | A1 | | 1/2002 | Ben-Shaul et al. | |
| 2002/0078174 | A1 | | 6/2002 | Sim et al. | |
| 2002/0083118 | A1 | | 6/2002 | Sim | |
| 2002/0174168 | A1 | | 11/2002 | Beukema et al. | |
| 2002/0184357 | A1 | | 12/2002 | Traversal et al. | |
| 2002/0194342 | A1 | | 12/2002 | Lu et al. | |
| 2003/0099237 | A1 | | 5/2003 | Mitra et al. | |
| 2003/0140111 | A1 | | 7/2003 | Pace et al. | |
| 2003/0158940 | A1 | | 8/2003 | Leigh | |
| 2003/0236813 | A1 | | 12/2003 | Abjanic | |
| 2004/0047354 | A1 | | 3/2004 | Slater et al. | |
| 2004/0162871 | A1 | | 8/2004 | Pabla et al. | |
| 2004/0267920 | A1 | | 12/2004 | Hydrie et al. | |
| 2004/0268357 | A1 | | 12/2004 | Joy et al. | |
| 2004/0268358 | A1 | | 12/2004 | Darling et al. | |
| 2005/0010653 | A1 | | 1/2005 | McCanne | |
| 2005/0022017 | A1 | * | 1/2005 | Maufer | ................... G06F 16/22 |
| | | | | | 726/4 |
| 2005/0055435 | A1 | | 3/2005 | Gbadegesin et al. | |
| 2005/0081211 | A1 | | 4/2005 | Koga et al. | |
| 2006/0015574 | A1 | | 1/2006 | Seed et al. | |
| 2006/0112176 | A1 | | 5/2006 | Liu et al. | |
| 2006/0248195 | A1 | | 11/2006 | Toumura et al. | |
| 2007/0005689 | A1 | * | 1/2007 | Leighton | ................. H04L 29/06 |
| | | | | | 707/E17.116 |
| 2007/0165622 | A1 | | 7/2007 | O'Rourke et al. | |
| 2008/0065724 | A1 | | 3/2008 | Seed et al. | |
| 2008/0071859 | A1 | | 3/2008 | Seed et al. | |
| 2008/0221941 | A1 | * | 9/2008 | Cherkasova | ........ G06F 11/3409 |
| | | | | | 718/105 |
| 2009/0049449 | A1 | | 2/2009 | Varadarajan | |
| 2009/0144444 | A1 | | 6/2009 | Chauffour et al. | |
| 2009/0172666 | A1 | | 7/2009 | Yahalom et al. | |
| 2009/0276842 | A1 | | 11/2009 | Yevmenkin et al. | |
| 2010/0257258 | A1 | | 10/2010 | Liu et al. | |
| 2010/0332664 | A1 | | 12/2010 | Yevmenkin et al. | |
| 2011/0099290 | A1 | | 4/2011 | Swildens et al. | |
| 2012/0059934 | A1 | | 3/2012 | Rafiq et al. | |
| 2012/0072525 | A1 | | 3/2012 | Yevmenkin et al. | |
| 2012/0106333 | A1 | | 5/2012 | Lee et al. | |
| 2013/0174177 | A1 | | 7/2013 | Newton et al. | |
| 2013/0332613 | A1 | | 12/2013 | Yevmenkin et al. | |
| 2015/0142943 | A1 | | 5/2015 | Yevmenkin et al. | |
| 2016/0150000 | A1 | | 5/2016 | Yevmenkin et al. | |

OTHER PUBLICATIONS

Canadian Examination Report, dated Jun. 8, 2017, Application No. 2,811,211, filed Sep. 12, 2011; 3 pgs.
Canadian Examination Report, dated Oct. 11, 2018, Application No. 2,862,339, filed Dec. 26, 2012; 3 pgs.
European Examination Report, dated May 5, 2014, Application No. 09715967.7, filed Feb. 23, 2009; 8 pgs.
European Examination Report, dated Oct. 9, 2017, Application No. 12862575.3, filed Oct. 26, 2017; 10 pgs.
European Extended Examination Report, dated Jul. 15, 2013, Application No. 09715967.7, 6 pgs.
Extended European Search Report, dated Jul. 2, 2015, Application No. 12862575.3, filed Dec. 26, 2012; 7 pgs.
Extended European Search Report, dated Nov. 23, 2015, Application No. 11825743.5, filed Sep. 12, 2011; 7 pgs.
International Preliminary Report on Patentability WIPO, dated Aug. 31, 2010, PCT/US09/034834, Intl filing date Feb. 23, 2009, 5 pgs.
International Preliminary Reporton Patentability, dated Mar. 19, 2013, Int'l Appl. No. PCT/US11/051254, Int'l Filing Date Sep. 12, 2011, 8pgs.
International Search Report, dated Jan. 26, 2012, Intl Appl No. PCT/US11/51254, Intl Filing Date Sep. 12, 2011, 3 pgs.
International Search Report, dated Mar. 5, 2013, Int'l App. No. PCT/US12/071674, Int'l Filing Dated Dec. 26, 2012, 5 pgs.
Search Report and Written Opinion, dated Apr. 14, 2009,, WIPO, PCT Appln. PCT/US09/034834, Intl filing date Feb. 23, 2009, 7 pgs.
Written Opinion, dated Jan. 26, 2012, Intl Appl No. PCT/US11/51254, Intl Filing Date Sep. 12, 2011, 6 pgs.
Written Opinion, dated Mar. 5, 2013, Int'l App. No. PCT/US12/071674, Int'l Filing Date Dec. 26, 2012, 9 pgs.
Chankhunthod, A. et al., "A Hierarchical Internet Object Cache", *Proc. of the 1996 USENIX Technical Conf.*153-163.
Cohen, J. et al., "Cache Array Routing Protocol v1.1", http://tools.ietf.org/id/draft-vinod-carp-v1-01.txt (Last-Modified: Wed, Oct. 1, 1997), 8 pages.
Danzig, P. B. et al., "An analysis of wide-area name server traffic: a study of the Internet Domain Name System", Conf. Proc. Communications Architectures & Protocols; D. Oran, Ed. SIGCOMM '92; ACM Press, New York, NY, 281-292.

(56) References Cited

OTHER PUBLICATIONS

Deering, S. E. et al., "Multicast routing in datagram internetworks and extended LANs", ACM Trans.Comput. Syst. 8,2, 85-110.

Devine, R., "Design and Implementation of DDH: A Distributed Dynamic Hashing Algorithm", In Proc. 4th Int'l Conf. on Foundations of Data Organizations and Algorithms, 101-114.

Doi, K., "Super Proxy Script—How to make distributed proxy servers by URL hashing", Sharp Corp., http://naragw.sharp.co.jp/sps/; download Jul. 7, 2007.

Evans, D. J. et al., "Load Balancing with Network Partitioning Using Host Groups", *Parallel Computing* Elsevier Publishers, Amsterdam, NL; vol. 20, No. 3 Mar. 1, 1994 00:00:00.0pp. 325-345.

Evans, D. J. et al., "Load Balancing with Network Partitioning Using Host Groups", *Parallel Computing* vol. 20, No. 3 Mar. 1, 1994 00:00:00.0pp. 325-345.

Floyd, S. et al., "A reliable multicast framework for light-weight sessions and application level framing", *IEEE/ACM Trans. Netw.* 784-803.

Floyd, S. et al., "A Reliable Multicast Framework for Light-Weight Sessions and Application Level Framing", In Proc. of ACM SIGCOMM '95, Aug. 1, 1995 00:00:00.0342-356.

Gwertzman, J. et al., "The Case for Geographical Push-Caching", Proc. Workshop on Hot OS '95, 51-55.

Gwertzman, J. et al., "World-Wide Web Cache Consistency", Proc. 1996 USENIX Tech. Conf., pp. 141-151, San Diego, CA.

Karger, D. et al., "Consistent Hashing and Random Trees: Distributed Caching Protocols for Relieving Hot Spots on the World Wide Web", In Proc. 29th Annual ACM Symp. on Theory of Computing May 1, 1997 00:00:00.0654-663.

Karger, et al., "Web caching with consistent hashing, Computer Networks", *Elsevier Science Publishers, BV*, vol. 31, No. 11-16 May 17, 1999 00:00:00.01203-1213.

Kostadinova, R., "Peer-to-Peer Video Streaming", [online; retrieved on Jan. 25, 2013]; Retrieved from the Internet <URL: http://www.ee.kth.se/php/modules/publications/reports/2008/XR-EE-LCN_2008_004.pdf>, especially section 5.4.1 2008-01-011-53.

Kun-Lung, Wu et al., "Load Balancing and Hot Spot Relief for Hash Routing among a Collection of Proxy Caches", *icdcs, p. 0536 19th IEEE International Conference on Distributed Computing Systems (ICDCS'99)*, Jan. 1, 1999 00:00:00.0.

Leite, Fabio Olive, "Load-Balancing HA Clusters with No Single Point of Failure", *Linux-Congress 2002: 9th International Linux System Technology Conference* Cologne, Germany.

Litwin, W. et al., "LH*—A Scalable, Distributed Data Structure", *ACM Trans. on Database Systems*, vol. 21, No. 4, pp. 480-525,1-43.

Microsoft Corp,, "Cache Array Routing Protocol and Microsoft Proxy Server version 2.0", downloaded 2007.

Microsoft Corp,, "How Load Balancing Technology Works", updated Mar. 28, 2003.

Microsoft Corp,, "Windows 2000 Network Load Balancing Technical Overview", Downloaded 2007.

Oguchi, et al., "A Study of Caching Proxy Mechanisms Realized on Wide Area Distributed Networks", High Performance Distributed Computing, 5th Int'l Symposium Aug. 1, 1996 00:00:00.0pp. 443-449.

Palmer, M. et al., "Fido: A Cache that Learns to Fetch", In Proc. the 17th Int'l Conf. on Very Large Data Bases, 255-264.

Panigrahy, R., "Relieving Hot Spots on the World Wide Web", Master's thesis, MIT EECS Jun. 1, 1997 00:00:00.0pp. 1-66.

Plaxton, G. C. et al., "Fast Fault-Tolerant Concurrent Access to Shared Objects", In Proc. 37th IEEE Symp. of Foundations of Computer Science Oct. 1, 1996 00:00:00.0pp. 570-579.

Ross, K. W., "Hash-Routing for Collections of Shared Web Caches", *IEEE Network Magazine* 11, 7:37-44, pp. 1-21.

Sit, Yiu-Fai et al., "Socket cloning for cluster-based web servers", *Cluster Computing, 2002. Proceedings, 2002* IEEE International Conference on Sep. 23-26, 2002, Piscataway, NJ, USA, IEEE; XP010621891; ISBN: 978-0-7695-1745-2, pp. 333-340.

Thaler, D. G. et al., "Using name-based mappings to increase hit rates", IEEE/ACM Trans. Netw. 6,1, 1-14.

Topcuoglu, S. et al., "The software architecture of a virtual distributed computing environment", *Proc. High-Performance Distributed Computing Conf., 1997*.

Vaidya, Sujit et al., "A single system image server cluster using duplicated MAC and IP addresses", *Local Computer Networks, 2001, Proceedings LCN 2001* 26th Annual IEEE Conference on Nov. 14-16, 2001, Piscataway, NJ, USA, XP010584033; ISBN: 978-0-7695-1321-8 2001-11-14 00:00:00.0pp. 206-214.

Valloppillil, Vinod et al., "Cache Array Routing Protocol v1.0", http://icp.ircache.net/carp.txt, downloaded on Jul. 16, 2007.1-7.

Valloppillil, Vinod et al., "Cache Array Routing Protocol v1.0", http://www.watersprings.org/pub/id/draft-vinod-carp-v1-02.txt, downloaded on Jul. 16, 2007.1-7.

Valloppillil, Vinod et al., "Hierarchical HTTP Routing Protocol", http://icp.ircache.neUdraft-vinod-icp-traffic-dist-OO.txt, downloaded on Jul. 16, 2007.1-7.

* cited by examiner

LOAD-BALANCING CLUSTER

FIELD OF THE DISCLOSURE

This invention relates to content delivery.

Glossary

As used herein, unless stated otherwise, the following terms or abbreviations have the following meanings:
MAC means Media Access Control;
MAC address means Media Access Control address;
IP means Internet Protocol;
TCP means Transmission Control Protocol;
"IP address" means an address used in the Internet Protocol to identify electronic devices such as servers and the like;
ARP means Address Resolution Protocol;
HTTP means Hyper Text Transfer Protocol;
URL means Uniform Resource Locator;
IGMP means Internet Group Management Protocol;
DNS means Domain Name System.

BRIEF DESCRIPTION OF THE DRAWINGS

The following description, given with respect to the attached drawings, may be better understood with reference to the non-limiting examples of the drawings, wherein.

THE PRESENTLY PREFERRED EXEMPLARY EMBODIMENTS

Figure 1:
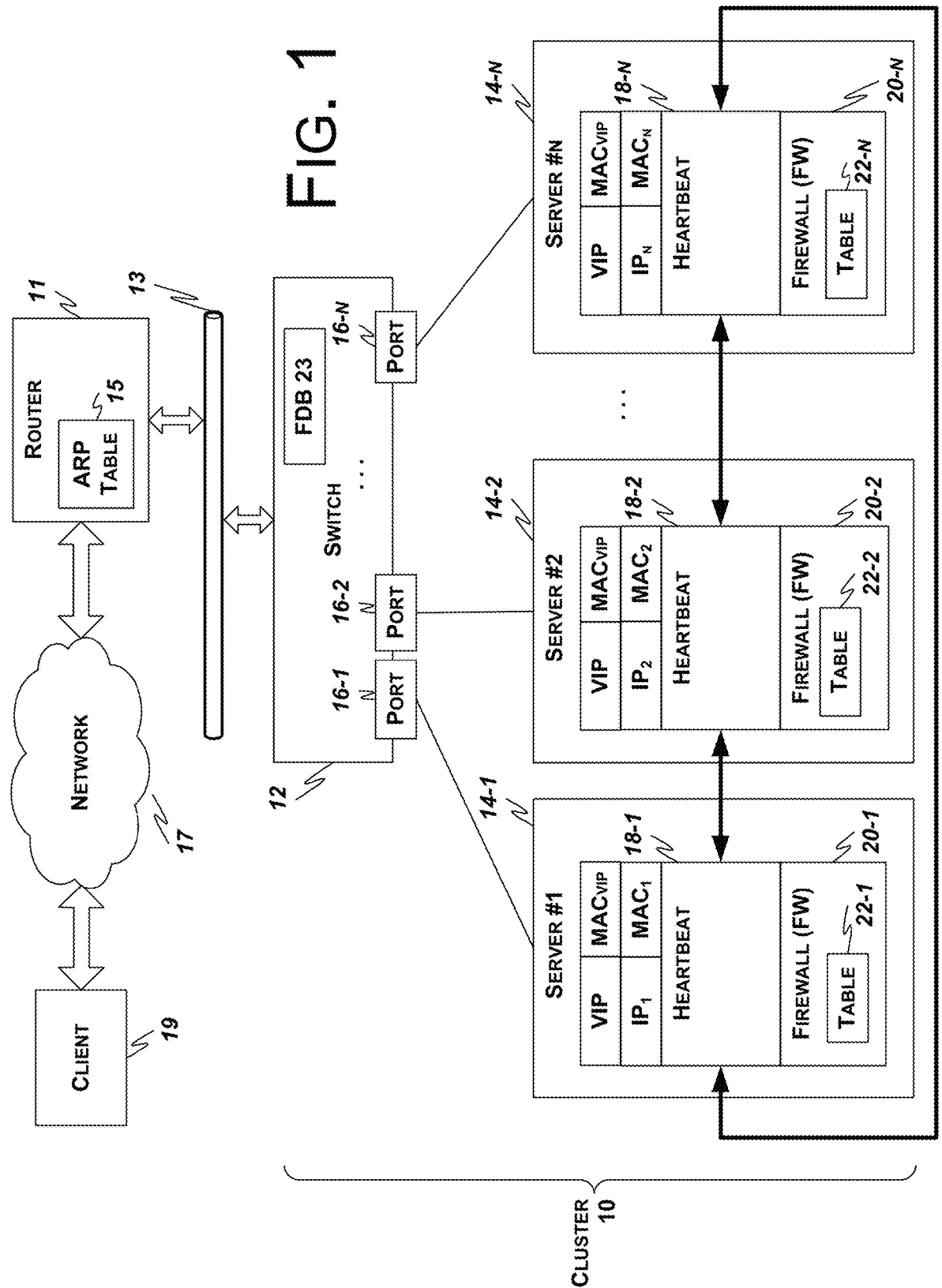
FIG. 1 depicts a load-balancing cluster.

As shown in FIG. 1, a load-balancing cluster 10 is formed by an n-port switch 12 connected to a number (between 1 and n) of servers 14-1, 14-2, ..., 14-m, where m≤n (collectively "servers 14") via ports 16-1, 16-2, ..., 16-n. Not every port 16-k of the switch 12 needs to have an actual (or operating) server 14 connected thereto. The switch 12 is preferably an Ethernet switch.

Each server 14-j includes a processor (or collection of processors) constructed and adapted to provide data in response to requests. In presently preferred implementations, all servers are the same and run the same version of operating system (OS), with same kernel and software. However, those skilled in the art will realize and understand, upon reading this description, that the servers may be any server running any type of server processes. Those skilled in the art will further realize and understand, upon reading this description, that the servers need not all be the homogeneous, and heterogeneous servers are contemplated herein.

Each server 14-j in the cluster 10 is addressable by a unique hardware address—in the case of the Ethernet, a so-called a MAC address (also known sometimes as an Ethernet address). For the purposes of this description, the MAC or actual hardware address of the j-th cluster server is denoted MACj.

The servers 14 in the load-balancing cluster 10 are all assigned the same virtual IP address (VIP), e.g., "10.0.0.1". Each server preferably also has at least one other unique (preferably local) IP address, denoted IPj for the j-th cluster server. Preferably a VIP address is also has MAC address (denoted MACVIP) associated with it, with the VIP's MAC address being shared by all the servers in a cluster. That is, in preferred embodiments, the (VIP, VIP's MAC address) pair, i.e., (VIP, MACVIP) is the same for all the servers in a cluster. However, as noted, each server also preferably has its own private (IP address, IP's MAC address) pair (e.g., (IPi, MACi)).

The servers 14 in cluster 10 are addressable externally (e.g., from network 17, e.g., the Internet) via the local (Ethernet) network 13 and switch 12. For example, using router 11, an external request from client 19 via network 17 (such as the Internet) to the IP address VIP is directed via the switch 12 to each real cluster server 14-j connected thereto. The switch 12 forwards Ethernet frames, preferably as fast and as efficiently as possible. The switch 12 may perform one-to-one (unicast) forwarding or one-to-many (broadcast or multicast) forwarding. In unicast forwarding a packet enters the switch on one port and leaves the switch on another port. In the case of broadcast or multicast forwarding packet enters the switch on one port and multiple copies of the same packet leave the switch on many ports. When broadcast forwarding (using, e.g., a so-called "unlearned" unicast MAC address), the switch sends all incoming packets to every port, whereas when multicasting (using a multicast MAC address), the switch sends all packets to those ports that have servers connected thereto. In either case, the desired result is that all cluster members—i.e., all servers 14 connected to the switch 12—get all packets destined for the IP address VIP.

In case of multicast MAC address, the switch 12 may use so-called "IGMP snooping" to learn which physical ports belong to live servers. In case of an "unlearned" unicast MAC address, the switch 12 forwards incoming traffic to all ports.

The system is not limited by the manner in which the switch 12 provides packets to the servers 14 connected thereto. Those skilled in the art will realize and understand, upon reading this description, that different and/or other methods of achieving this result may be used.

In a local Ethernet network, an Ethernet MAC address is used to identify a particular host machine connected to the network. In such a network, a protocol such as, e.g., ARP, may be used to translate between a host's IP address and its Ethernet MAC address. For example, a host on an IP network wishing to obtain a physical address broadcasts an ARP request onto the IP network. A host on the network that has the IP address in the request then replies with its physical hardware address.

An IP router provides a gateway between two (or more) IP networks. The purpose of an IP router is to forward IP packets from one IP network to another. An IP router should have an interface and IP address in each network to which it is connected. So, IP router 11 has at least two interfaces and two IP addresses: one IP address to connect to the upstream network (17 in FIG. 1) and the other IP address to connect to the local Ethernet network (13 in FIG. 1).

A request from client 19 is made to the IP address VIP (via network 17) and reaches the router 11. The request comes into the router 11 via the interface connected to the upstream network 17, and the router 11 forwards the request to the VIP (on the local Ethernet network 13).

Because the local network 13 is an Ethernet network and because router 11 is connected directly to the local network 13, the router 11 encapsulates the IP packet (i.e., the request) into an Ethernet packet before sending it. In order for the router 11 to know where to send the Ethernet packet, the router makes an ARP request. Once the Ethernet packet is sent, the switch 12 forwards it to the server(s) 14.

In order to affect ARP mapping, a router (e.g., router 11) typically maintains a so-called ARP table 15 (mapping IP addresses to the MAC addresses of hosts connected thereto). In this manner, when an IP packet is sent to a particular host that is connected to the router 11, the router automatically resolves to the destination host's MAC address and forwards the packet to the appropriate host. The router 11 will try to deliver the IP packet directly to destination (i.e., the VIP) because the router is connected to the same local Ethernet network.

Certain special MAC addresses (e.g., broadcast or multicast) can be used to instruct a switch to broadcast (or multicast) a packet, thereby providing a packet to all hosts connected to that switch. Specifically, e.g., an Ethernet switch sends a packet with a broadcast or multicast MAC address in its destination field to every port (or every port with a server connected thereto), whereby every host/server connected to the Ethernet switch should get a copy of the packet.

In order for two machines (e.g., client 19 and one of the servers 14) to interact, a network connection must be established between them. The client 19 has the IP address of a server (in this case VIP), and tries to establish a connection via the network 17 and the router 11.

When the router 11 gets a request to connect to a server with the IP address VIP (shared by the cluster servers 14-*j*), the router maps the IP address VIP to a special MAC address that causes the switch 12 to forward the request to each server connected thereto. In the case of the load-balancing cluster 10, preferably the switch 12 treats the MAC address for a VIP as a multicast Ethernet address. Consequently, each member of the cluster 12 (i.e., each server 14) sees all incoming traffic (addressed to VIP). The router's ARP table 15 thus gets a multicast Ethernet address for the VIP, and thus, at the IP layer, all incoming traffic to the VIP address is provided to all servers 14 connected to the switch 12. In a presently preferred implementation, the switch 12 maintains a so-called "forwarding database," (FDB 23 in FIG. 1) to map destination Ethernet MAC addresses to physical Ethernet ports 16 on switch 12. When switch 12 receives an Ethernet packet, the switch queries the forwarding database (e.g., using the destination MAC address as a key) and tries determine which physical port should be used to send the Ethernet packet out. This forwarding database 23 allows switch 12 to forward Ethernet packets only where they should go.

However, when switch 12 receives an Ethernet packet and cannot find an entry in its forwarding database for a destination Ethernet MAC address (i.e., e.g., in the case of an unknown/unlearned MAC address), the switch forwards such an Ethernet packet to all the ports (except the one it came from).

A multicast Ethernet MAC address has entry in the switch's 12 forwarding database instructing it to forward Ethernet packet to multiple ports 16.

An Ethernet switch will generally try to learn by looking at the MAC addresses of all the Ethernet packets passed through the switch and will try to update its forwarding database accordingly. However, it is preferable to ensure that the switch 12 never "learns" about MAC address for the VIP and never builds an association between VIP cluster MAC addresses and physical ports 16. The switch 12 is thereby forced to always forward Ethernet packets destined for the cluster MAC address (and thus the cluster VIP) to multiple/ all ports 16. Those skilled in the art will realize and understand, upon reading this description, that different and/or other ways of causing the switch to provide incoming data to all cluster members may be used.

Having found a cluster server with the IP address VIP, a TCP connection must be established between the client 19 and that cluster server 14. A TCP connection is established between two machines, in part, using a well-known three-way handshake (SYN, SYN/ACK, ACK). This protocol is described, e.g., in "RFC 793—Transmission Control Protocol," September 1991, the entire contents of which are incorporated herein by reference for all purposes.

In the cluster 10, when a TCP connection is first established, each cluster member (i.e., each server 14) effectively decides which server 14 will handle a connection. In effect, each cluster member decides for itself whether or not to handle a connection. Once a particular cluster member takes (or is given) responsibility for a particular connection, the other cluster members do not handle (and need not even see) traffic related to that connection. The manner of server selection is described below.

Each cluster member (server) includes a stateful firewall (FW) mechanism that is used to filter unwanted incoming traffic. In FIG. 1, for the purposes of this discussion, the firewall mechanism for the j-th server is denoted 20-*j*. Upon receipt of an IP packet, the firewall first determines whether the packet is for an old (i.e., already established) connection or for a new connection. For already-established connections each firewall mechanism is configured to reject incoming traffic that does not have an entry in its firewall state table 22, and only to accept incoming traffic that does have an entry in its firewall state table. In FIG. 1, the firewall table for the j-th server is denoted 22-*j*. The firewall must still inspect packets associated with new connections (i.e., connections in the process of being established, specifically packets with only SYN flag set). To summarize: first the firewalls make a decision as to whether an IP packet is "new" or "old". If the packet is "old" then it is discarded unless a state entry exists. If the packet is "new" it is passed for further inspection (e.g., load balancing) and then, depending on the results, can be either discarded or accepted.

Once it is determined (e.g., as described below) that a particular cluster member 14-*j* is going to handle incoming traffic on a certain connection, a corresponding entry is created in that member's firewall state table 22-*j*. Specifically, the cluster member/server creates a firewall state table entry for any packet that belongs to a connection initiated from or accepted by the cluster member. If a packet indicates that a remote host wishes to open a new connection (e.g., via an IP SYN packet), then such packet gets inspected by a firewall rule that determines whether or not the cluster member should accept it. If the packet was accepted by a cluster member, the firewall state table for that cluster member is updated and all subsequent packets on the connection will be accepted by the cluster member. The firewalls of the other cluster members will block packets that they are not supposed to be processing (i.e., packets that do not belong to connections they initiated or accepted).

The firewall rule preferably ensures that only one cluster member will accept a particular connection, however in some cases, it is possible that more than one cluster member decide to accept the same connection. This situation would create duplicate responses from the cluster. However, as those skilled in the art will realize and understand, upon reading this description, this is not a problem for a TCP connection because the remote host will only accept one response and discard others. In this scenario only one cluster member will be able to communicate with the remote host, other cluster members will have a stuck connection that will be closed due to timeout. In the case when no servers respond to an initial SYN packet the client will retry and will send another SYN packet after a timeout. While cluster members may have inconsistent state, they should converge and achieve consistent state quickly.

The firewall determines which cluster member should handle a particular connection using a given mapping function, preferably a hash function. By way of example, the hash function jhash, a standard hash function supplied in the Linux kernel, may be used. Those skilled in the art know how to produce a number in a particular range from the output of a hash function such as jhash. The hash function produces an integer value. To obtain a value in the range 1 to m, for some m, the output of the hash function is divided by m and the remainder is used (this operation may be performed using an integer remainder or modulo operation). For load balancing in a cluster, the value of m is the number of currently live servers in the cluster. Those skilled in the art will realize and understand, upon reading this description, that the function's output value need not be offset by one if the buckets are numbered starting at zero.

Using, e.g., jhash, the function MAP(source IP, m) may be implemented as:
 (jhash(parameters) modulo m)

If there are m alive servers in a cluster, each server 14 performs the (same) mapping function (with the same inputs). Each server or cluster member 14 is associated with a particular local server number (or agent identifier (ID)). E.g., if there are eight servers 14-0, . . . , 14-7, their corresponding agent IDs may be 0, 2, . . . , 7, respectively. Each server compares the result of the mapping function (e.g., hash modulo m) to its local server number. If the result of the mapping function is equal to the local server number, the packet is accepted, otherwise the packet is dropped.

Note that the exemplary functions shown above all operate on values related to the particular connection (e.g., source and destination address and port information). However, in a simplified case, the mapping function may be one which merely takes as input the number of active servers (MAP (m)→{1 . . . m}). An example of such a function is a round-robin function. Another example of such a function is one which uses external (possibly random) information. Note, however, that since all servers have to use the same mapping function and have to produce the same result, such a function would need to access a global space and all invocations of such a function (from each cluster server) would need to be operating on the same values.

EXAMPLE I

By way of example, and without limitation, consider a cluster with 8 ports and with 7 active servers connected to those ports as shown in the following table:

| Port #. | 0 | 1 | 2 | 3 | 4 | 5 | 6 | 7 |
|---|---|---|---|---|---|---|---|---|
| Server | S0 | S1 | S2 | S3 | S4 | — | S6 | S7 |
| Bucket | 0 | 1 | 2 | 3 | 4 | 5 | 6 | |

In this case, the number of active servers, m, is 7, there are seven buckets (numbered 0 to 6), and so the mapping function should produce a number in the range 0 to 6. Suppose, for the sake of this example, that the mapping function is:
 MAP (source IP, destination IP, destination port, m)=hash (source IP, destination IP, destination port) modulo m If a connection request comes in from IP address 123.156.189.123, for the VIP (1.0.0.1) on port 80. Each server runs the mapping function:
 hash (123.222.189.123, 1.0.0.1, 80) modulo 7

Suppose that this mapping produces a value of 4 then server S4 (which corresponds to bucket 4) handles the connection. Suppose that at some time one of the servers, e.g., S3 becomes inactive. The status of the cluster is then as follows:

| Port #. | 0 | 1 | 2 | 3 | 4 | 5 | 6 | 7 |
|---|---|---|---|---|---|---|---|---|
| Server | S0 | S1 | S3 | — | S4 | — | S5 | S6 |
| Bucket | 0 | 1 | 2 | — | 4 | | 4 | 5 |

Notice that the association between servers and buckets has changed, so that server S4 is now associated with bucket 3, and server S5 is associated with bucket 4. Now, as there are only five "alive" severs, the mapping function must produce a value in the range 0 to 5. If a new connection comes in, and if the mapping function produces a value 4, then server S6 (not S5) will handle this connection.

If a new server S7 is connected to port 5, the number of servers becomes 7 and the status of the cluster would be:

| Port #. | 0 | 1 | 2 | 3 | 4 | 5 | 6 | 7 |
|---|---|---|---|---|---|---|---|---|
| Server | S0 | S1 | S2 | — | S4 | S7 | S5 | S6 |
| Bucket | 0 | 1 | 2 | | 3 | 4 | 5 | 6 |

End of Example I

Those skilled in the art will realize and understand, upon reading this description, that the buckets may be renumbered or reordered in different ways when a server is added to or removed from the cluster. For example, it may be desirable to give the new server the bucket number 5 and to leave the other servers as they were. It should be noted that existing connections are not affected by server/bucket renumbering because load balancing is only performed on new connections. Existing (i.e., old) connections handled entirely in the firewall.

Heartbeat

Each cluster member 14 includes a so-called heartbeat processes/mechanism 18. Each heartbeat mechanism 18 (on each cluster member 14) is a process (or collection of processes) that performs at least the following tasks:
 monitors server configurations on the cluster;
 answers ARP queries for the configured VIPs;
 monitors local state and state of other cluster members; and
 controls local load balancing firewall configuration.

The heartbeat monitors the state of VIPs on servers. Each server may have more than one VIP configured, and the heartbeat keeps track of each VIP's state separately.

While described herein as a single mechanism, those skilled in the art will realize and understand, upon reading this description, that the various functions of the heartbeat mechanism can each be considered a separate function or mechanism.

The Heartbeat Mechanism Monitors Server Configuration on the Cluster

The heartbeat mechanism 18 on each cluster member/server 14 determines its own state as well as that of each VIP on other cluster members. (In order to simplify the drawing, not all of the connections between the various heartbeat mechanisms are shown in FIG. 1.)

On each cluster member/server, heartbeat mechanism 18 maintains information about other VIPs in the cluster 10 (preferably all other VIPs). To this end, the heartbeat mechanism 18 builds and maintains a list of VIPs connected to the switch 12, and then, for each of those VIPs, maintains (and routinely updates) information. The heartbeat mechanism 18 on each server 14 first builds a list of network interfaces in the system and obtains information about IP addresses on these interfaces. The heartbeat mechanism 18 may, e.g., use, as its main input, a table containing information about the local cluster and VIPs. In general, an external process may provide VIP configuration on the local cluster to the heartbeat process, e.g., in a form of table. Those skilled in the art will know and understand, upon reading this description how such a process and table may be defined and configured.

The heartbeat mechanism 18 considers each VIP in the cluster 10 to be in one of three states, namely "configured", "connecting" and "connectable". In order to maintain these states, the heartbeat mechanism 18 obtains a list of VIPs that should be configured on the cluster 10. Each VIP from the list is preferably cross-checked against list of IP addresses on all interfaces. If a match is found, the VIP is marked as "configured". (A VIP is in the "configured" state—when the VIP is configured on one of the local (to host) interfaces). For every VIP marked as "configured", the heartbeat mechanism 18 tries to initiate a TCP connection on a specified port, e.g., either 80 or 443. As soon as connection to a VIP is initiated, the VIP is marked as "connecting". If connection to a VIP is successful, the VIP is marked as "connectable". A VIP's state is "connecting" when a TCP health check is currently in-progress; a VIP's state is "connectable" when the most recent TCP health check succeeded.

The heartbeat mechanism 18 continuously performs the actions described above, preferably at fixed, prescribed time intervals.

If a VIP changes its state or completely disappears from the list of IP addresses, a state transition in noted. Servers are automatically configured (or removed) on (from) loopback clone interfaces as needed. In a presently preferred implementation, the heartbeat mechanism takes over the first 100 (Io:0-10:99) loopback clone interfaces. If needed, manual loopback interfaces can be configured starting from Io:100 and up.

The Heartbeat Mechanism Answers Arp Queries for the Configured VIPS

Each active heartbeat mechanism 18 continuously listens for ARP requests. Upon receipt of an ARP request, the heartbeat mechanism examines request to see if it relates to a VIP that should be configured on the cluster. If the ARP request does relate to a VIP, the heartbeat mechanism checks if the VIP is in "configured" state and if so, the heartbeat mechanism replies with an ARP reply for that VIP.

Although multiple heartbeat mechanisms may reply to the same ARP request, this is not a problem, since they will each return the same MAC address (MACVIP).

The Heartbeat Mechanism Monitors Local State and State of Other Cluster Members The heartbeat mechanism 18 preferably tries to maintain full state information for all servers 14 in the cluster 10. State per cluster preferably includes one or more of: (a) number of cluster members that should serve traffic for the cluster, (b) number of cluster members that are serving traffic for the cluster; and (c) timestamp information. Those skilled in the art will realize and understand, upon reading this description, that different and/or other state information may be maintained for the cluster and for cluster members.

Each heartbeat mechanism preferably announces its full state to other cluster members at a prescribed time interval. State updates are preferably sent to a multicast UDP address which is shared by all cluster members. (Note: this UDP multicast is not the same as the VIP multicast discussed above.) The heartbeat mechanism can also be configured to send multiple unicast UDP messages to each member of the cluster when performing state announcing.

Each heartbeat mechanism updates its state upon receiving state update from other cluster members if the following conditions are met: the server is present on the receiving cluster member and the received state is "newer" (per timestamp) than the current state on receiving cluster member. Since a timestamp is used, preferably clocks on all cluster members are synchronized.

At prescribed time intervals a heartbeat mechanism 18 analyzes its state and checks for state transitions. The heartbeat mechanism checks each server's state and makes sure that it is fresh. So-called "non-fresh" servers are automatically considered as "down". Each server's state is compared to its previous state, and, if different, a state transition is noted.

Changes to VIP state are made as they detected, based on the current heartbeat's view of the cluster.

Inter-Cluster Handoff

As described thus far, server selection has been made within a cluster by the cluster members at the TCP level. The system does not require a load balancing switch, thereby reducing the cost. Instead, as described, the system duplicates incoming (client-to-cluster) traffic to all servers in the cluster and lets each server decide if it is to deal with particular part of the incoming traffic. All servers in the cluster communicate with each other and decide on an individual server's health.

Another level of server selection—within a cluster—is also provided, as a result of which an initially-selected server (selected as described above) may pass on (or attempt to pass on) responsibility for a particular connection to another cluster member. For example, if one server in a cluster has already handled a particular request for a certain resource, that server may have that resource cached. The server with the already-cached copy of the resource may then be a better choice than another server in the cluster to process a request.

Accordingly, in some cases, after receiving a request from a client for a certain resource (after a server has been selected and the TCP connection has been established, as described above), the server may ascertain whether it is responsible for handling/serving the resource, and, if not, the previously-selected server may notify (or provide a notification) to another cluster member that is responsible for handling the resource (e.g., another cluster member that already has a copy of the requested resource). The notification may include a hand-off request to so that another cluster member responsible for the resource can server the resource itself. Or, alternatively, the notification may include a request for a copy of the resource (e.g., via a peer-fill request) from another cluster member responsible for the resource (i.e., that already has a copy of the requested resource).

The cluster member responsible for (handling) the requested resource may process the notification from the previously or originally selected server in a number of ways. For instance, a cluster member that has previously served the requested resource (or that is 'responsible' for handling the request, or already has a copy of the requested resource) may determine whether to accept or reject a hand-off request (or a peer-fill request) from the previously or originally selected server. For example, the other cluster member may decide to accept or reject the hand-off request (or peer-fill request) based on various attributes of the requested resource such as, but not limited to, the size and popularity of the requested resource.

In one embodiment, the responsible server accepts a hand-off request (or rejects a peer-fill request) if the size of the request resource exceeds a threshold value. This step is advantageous because copying a large resource to the previously selected server is inefficient and would not be a worthwhile expenditure of system and network resources. If, on the other hand, the size of the requested resource is small (i.e., does not exceed a size threshold), then it may be worthwhile to reject the hand-off request (or accept the peer-fill request) and provide a copy of the requested resource to the previously selected sever so that the previously selected server can handle the request.

According to another example embodiment, if it determined that the requested resource is popular (i.e., exceeds a popularity threshold), then the responsible server may reject the hand-off request (or accept/honor the peer-fill request) and (indirectly) force the previously selected server to obtain and serve the requested resource (or simply provide a copy of the requested resource to the previously selected server). Since the resource is popular and, thus, likely to continue to be requested frequently, it would be beneficial for other servers (i.e., the previously selected server) to have a copy of the requested resource so that the requested "popular" resource can be served more efficiently. For example, in addition to sending a hand-off rejection message, the responsible server may also provide a copy of the requested resource to the previously selected server (or the previously selected server may also obtain a copy of the requested resource from other sources, such as other peers, upstream servers, etc.).

As used herein, a "resource" may be any kind of resource, including, without limitation static and dynamic: video content, audio content, text, image content, web pages, Hypertext Markup Language (HTML) files, XML files, files in a markup language, documents, hypertext documents, data files, and embedded resources.

Once a TCP/IP connection is made between two machines (e.g., client 19 and a particular cluster member, server 14-$k$ (for some value of k)), the server 14-$k$ may receive a request from the client 19, e.g., for a resource. For example, the server 14-$k$ may receive an HTTP request (e.g., an HTTP GET request) from client 19. Such a request generally includes a URL along with various HTTP headers (e.g., a host header, etc.). The selected server 14-$k$ now determines whether it is responsible to handle this request or whether the request should be passed on to a different cluster member. To make this determination, the selected server 14-$k$ considers the request itself and applies a second given function to at least some of the information used to make the request (e.g., to the URL and/or headers in the request).

This second function essentially partitions the request space (e.g., the URL space) so as to determine whether the selected server is, in fact, responsible to for this particular request. If the server determines that it is responsible for the request, it continues processing the request. If not, the server hands-off the request (as described below) on to another cluster member (e.g., server 14-$p$) that is responsible for the request. Having successfully passed off the request, the cluster member, server 14-$k$, updates its firewall to reject packets associated with the connection. The responsible cluster member (server 14-$p$) correspondingly updates its firewall to accept packets associated with this connection.

For the sake of this discussion, the function used to partition the requests is referred to as a partition function. The partition function may be a hash function or the like. In some cases the partition function may take into account the nature or type of request or resource requested. For example, certain cluster members may be allocated to certain types of requests (e.g., movies, software applications, etc.). The partition function applied to the URL (and/or other information) can be used to implement a degree of policy based load mapping.

Exemplary partition functions are:
Partition (URL, m)→{1 . . . m}
Partition (URL, host header, m)→{1 . . . m}
Partition (URL, HTTP headers, m)→{1 . . . m}
where Partition (params, m) is implemented as, e.g.,
hash(params) modulo m
where m is the number of active servers in the cluster.

Those skilled in the art will realize and understand, upon reading this description, that different and or other parameters may be used in the Partition function. Further, not all parts of a parameter need be used. For example, if the URL is a parameter, the function may choose to use only a part of the URL (e.g., the hostname).

Since accounting and other information may be included in HTTP headers and/or URLs, such information may be used by the partition function. For example, a cluster may comprise a number of non-homogenous servers. Certain requests may be directed to certain cluster servers based on server capability (e.g., speed) or based on arrangements with customers.

Figure 2:
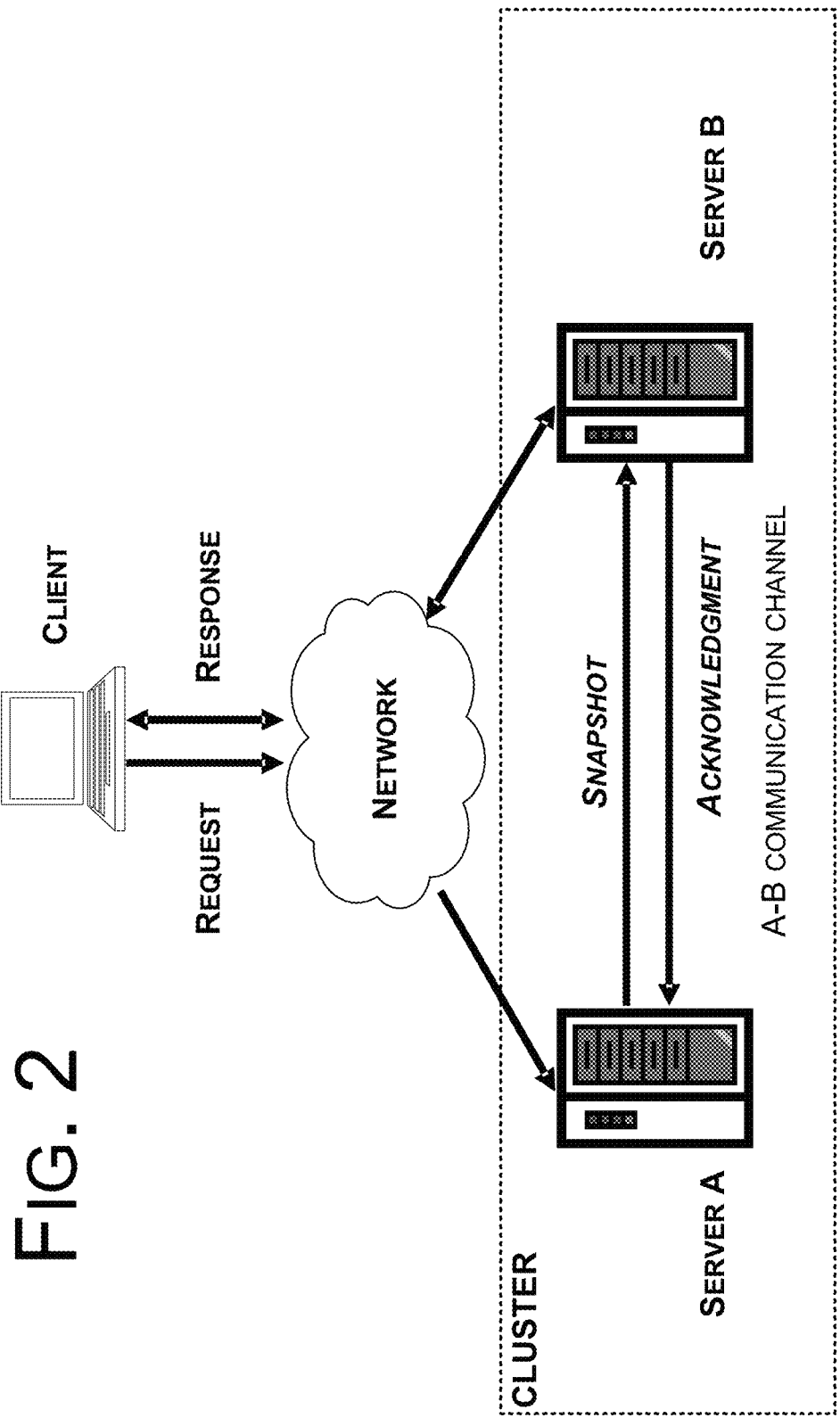
FIG. 2 depicts an exemplary TCP connection handoff.

In order to hand off a request to another server within its cluster, a server must be able to completely move an individual established TCP connection from one server to another in the same cluster. The following scenario, with references to FIGS. 2-4, describe this operation of the system. As shown in the FIG. 2, the cluster includes two servers: server A and server B. Each of the servers runs a web cache, listening on a shared VIP (and port, e.g., port 80). Remote clients make incoming TCP connections to the VIP and port (as described above).

Figure 3:
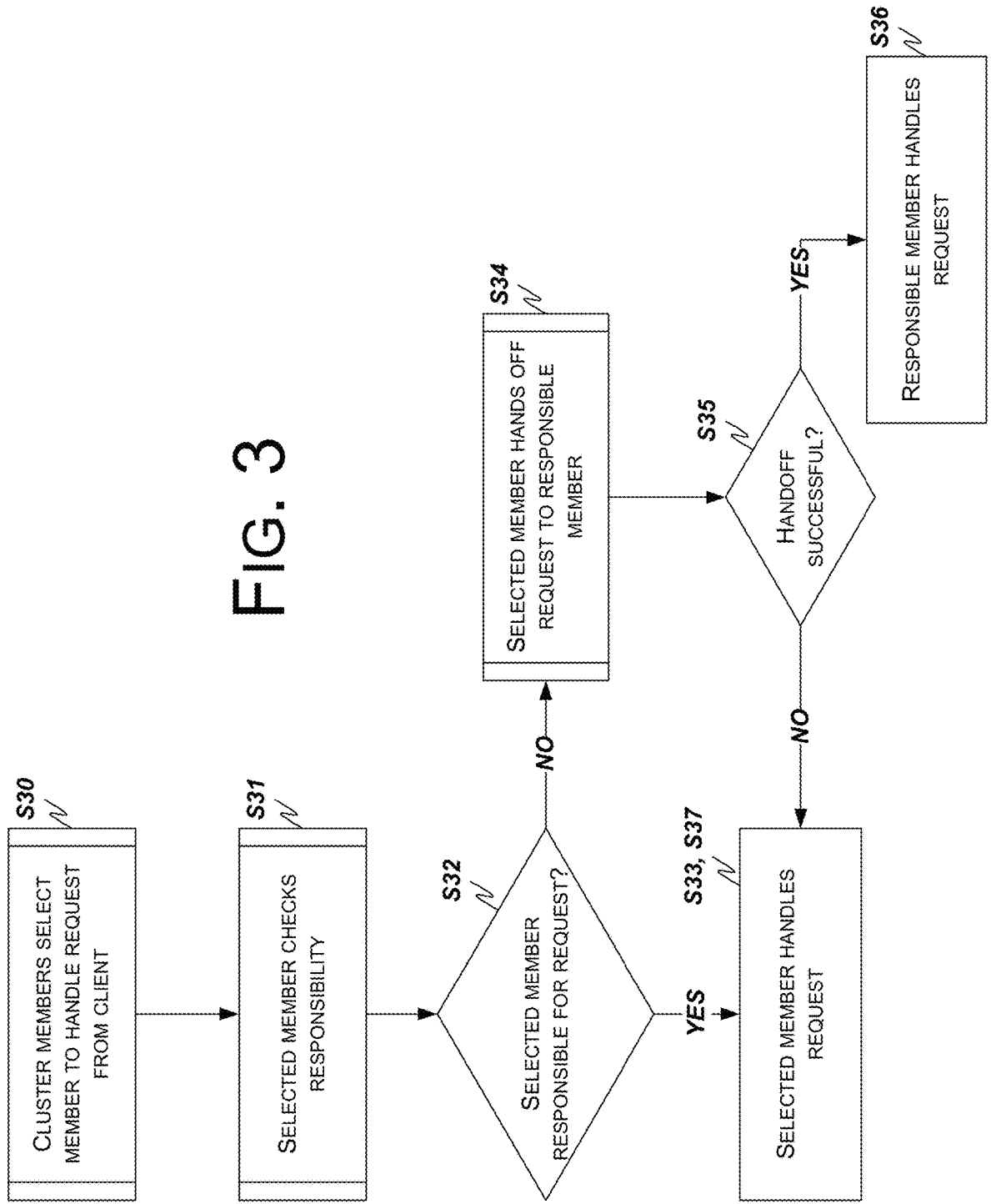
FIGS. 3-4 are flowcharts of a TCP connection handoff.

Using the TCP-level load balancing described above, assume that server A is initially selected to accept a particular TCP connection from a client (at S30 in FIG. 3). Server A accepts the connection from the client and waits for the HTTP request from the client. Using information from the HTTP request (e.g., the URL and one or more HTTP headers) server A decides to hand the request off to the server B. That is, the selected server (server A in this example) ascertains (using the partition function described above) whether it is the server responsible for the request (at S31). If the originally-selected server is responsible for the request (at S32), then it handles the request (at S33), otherwise it hands off (or tries to hand off) the request to the responsible cluster member (server B in this example) (at S34). If the handoff is determined to be successful (at S35), then the server responsible for the request (Server B in the example) handles the request (at S36), otherwise the originally selected server (Server A) handles the request (at S37).

The hand-off process (S34) takes place as follows (with reference to FIG. 4) (for the purposes of this discussion, assume that server A hands off to server B):

First the originally-selected server (Server A) freezes the TCP connection from the client (at S40). The selected server (Server A) then takes a snapshot of the frozen TCP connection (at S41), storing required information about the connection. The originally-selected server (Server A) then sends the snapshot of the frozen TCP connection to the responsible server (server B), preferably using a side communication channel to the responsible server (at S42).

The responsible server (Server B) receives the snapshot of the frozen TCP connection from the originally-selected server (Server A) (at S43). Using the snapshot of the frozen TCP connection, the responsible server (Server B) attempts to clone the TCP connection to the remote client (at S44). If the connection was cloned successfully, the responsible server (server B) sends acknowledgement to the originally-selected server (Server A), preferably using the side communication channel to the server A (at S45).

Upon receipt of the acknowledgement, the originally-selected server (Server A) closes the frozen TCP connection to the client (at S46).

The responsible server (Server B) then thaws the frozen (clone) TCP connection to the client (at S47).

Figure 4:
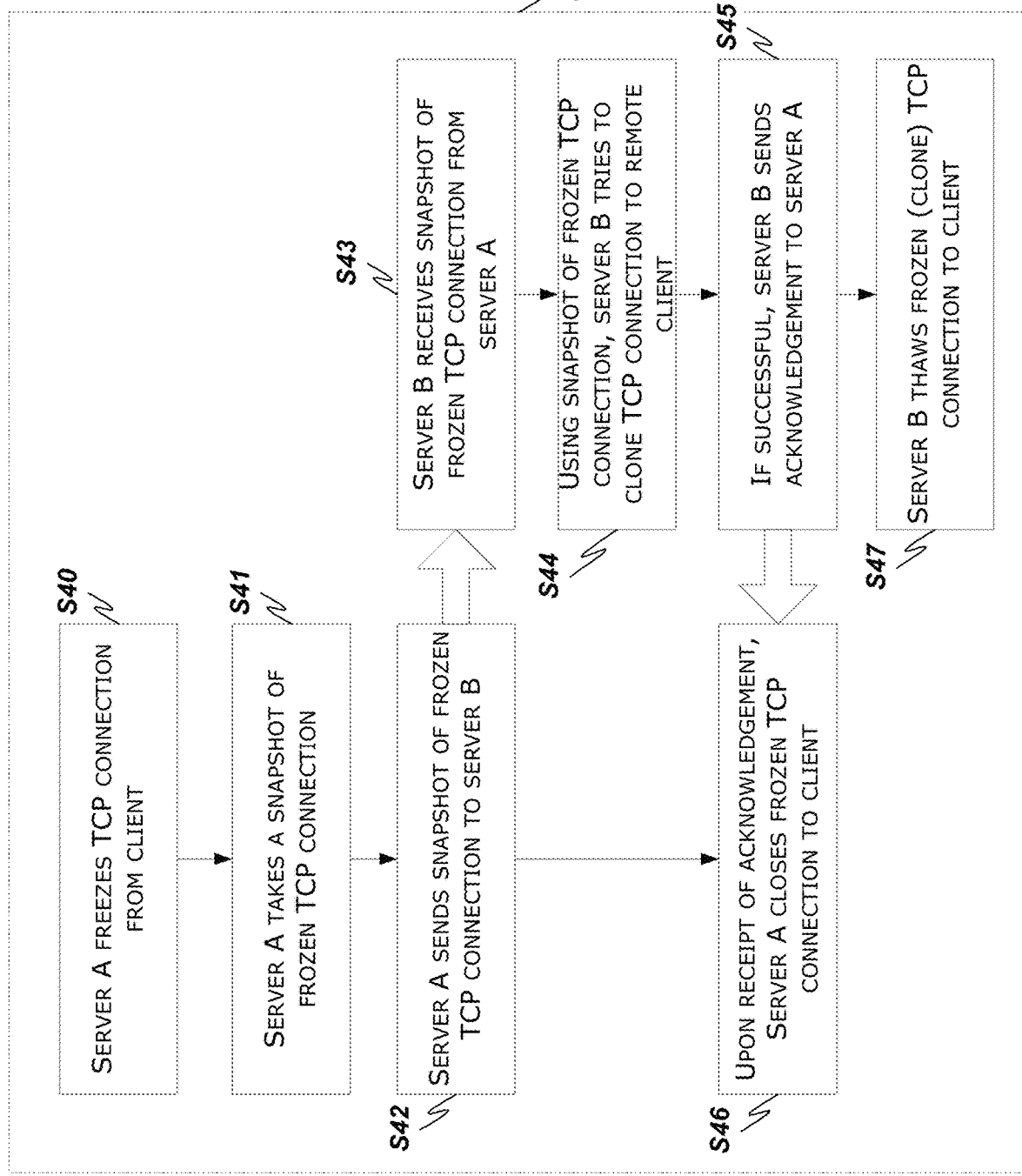

With the handoff successful, the responsible server (Server B) continues to process incoming HTTP request from the client (at 52 in FIG. 4).

The accepting server may fail to clone connection or may refuse to satisfy handoff request. In these cases a negative acknowledgment will be sent and originating (handoff) server will continue to process original request. Should the responsible server (Server B) decline (or fail to satisfy) the handoff request from the originally-selected server (Server A), server A may thaw the TCP connection and continue to serve it locally.

A responsible server generally should not decline a hand-off request or a request to take over a connection. However, a responsible server may have to decline a request, for example if its software is being shutdown. Note, too that two or more servers in the same cluster may be responsible for the same content, and may provide a degree of redundancy in content (to reduce fills from the origin server) and also to handle a so-called "flash crowd" when a certain piece of content becomes very popular for a relatively short period time.

When a handoff is successful, the responsible server must update its firewall to accept packets relating to that connection (and the server that handed off the connection must update its firewall to no longer accept such packets).

It should be apparent that only the server that is actually handling the connection will invoke the partition function. The other servers do not generally have the information required (e.g., the URL) to make the required decision.

The server making the handoff may provide the responsible server with information about the request (e.g., the type of request, the URL, the headers, etc.). In this way the responsible server may have sufficient information to satisfy the request.

EXAMPLE II

By way of example, and without limitation, consider a cluster with 8 ports and with 7 active servers connected to those ports as shown in the following table:

| Port #. | 0 | 1 | 2 | 3 | 4 | 5 | 6 | 7 |
|---|---|---|---|---|---|---|---|---|
| Server | S0 | S1 | S2 | S3 | S4 | — | S5 | S6 |
| Bucket | 0 | 1 | 2 | 3 | 4 | | 5 | 6 |

In this case, the number of active servers, m, is 7, there are seven buckets (numbered 0 to 6), and so the mapping function should produce a number in the range 0 to 6. Suppose, for the sake of this example, that the mapping function is:

MAP (source IP, destination IP, destination port, m)=hash (source IP, destination IP, destination port) modulo m If a connection request comes in from IP address 123.156.189.123, for the VIP (1.0.0.1) on port 80. Each server runs the mapping function hash (123.156.189.123, 1.0.0.1, 80) modulo 7

Suppose that this mapping produces a value of 4 then server S4 (which corresponds to bucket 4) is selected at the TCP level to handle the connection. Server S4 and the client then establish their connection and the client then sends an HTTP request (e.g., a GET request with a URL (URL1) and header information).

Server S4 invokes the partition function:

Partition (URL1, host header, 7)

Note that the partition function can use the same bucket association as the mapping function or it may use a different association. For example, if the partition function is implementing policy-based or capacity based distribution, then the partition function may need a separate bucket association. For this example, assume that the partition function uses the same bucket association as the mapping function.

Suppose that this invocation of the partition function returns a value of 6. This means that server S6 (associated with bucket no. 6) should handle this connection instead of the initially-selected server S4. So server S4 tries to hand off the connection to server S6.

Server S4 freezes the TCP connection from the client (at S40 in FIG. 4) and then takes a snapshot of the frozen TCP connection, storing required information about the connection (at S41). Server S4 sends the snapshot of the frozen TCP connection to Server S6, preferably using a side communication channel (at S42). Server S6 receives the snapshot of the frozen TCP connection from Server S4 (at S43). Using the snapshot of the frozen TCP connection, Server S6 attempts to clone the TCP connection to the remote client (at S44). If the connection is successfully cloned, then server S6 sends an acknowledgement to Server S4, preferably using the side communication channel (at S45). Upon receipt of the acknowledgement, Server S4 closes the frozen TCP connection to the client (at S46). Server S6 then thaws the frozen (clone) TCP connection to the client (at S47). With the handoff successful, Server S6 continues to process incoming HTTP request from the client.

Suppose now that another connection request comes in, this time from IP address 123.156.111.123, for the VIP (1.0.0.1) on port 80. Each server runs the mapping function:

hash (123.156.111.123, 1.0.0.1, 80) modulo 7

Suppose that the result of this function is 6 which corresponds to server S6. S6 connects with the client and the client then sends an HTTP GET request with a URL (URL1—the same as in the earlier request) and header information.

Server S6 invokes the partition function:

Partition (URL1, host header, 7)

Again the partition function returns the value 6. However, in this case the server responsible for the request is the one already handling the request, and so no handoff is needed (i.e., the check at S32 will return "YES"). Note that since server S6 has already served the resource associated with URL1, it may still have that resource cached.

End of Example II

Note that the number of servers connected to the switch could be greater than the number of servers responsible for the VIP. For example, a cluster may be configured with 20 servers connected to the same switch, 10 servers serving one VIP and another 10 servers serving another VIP. In this case the heartbeat assists in load balancing for two VIPs, and each VIP will be load balanced across 10 servers.

Figure 5:
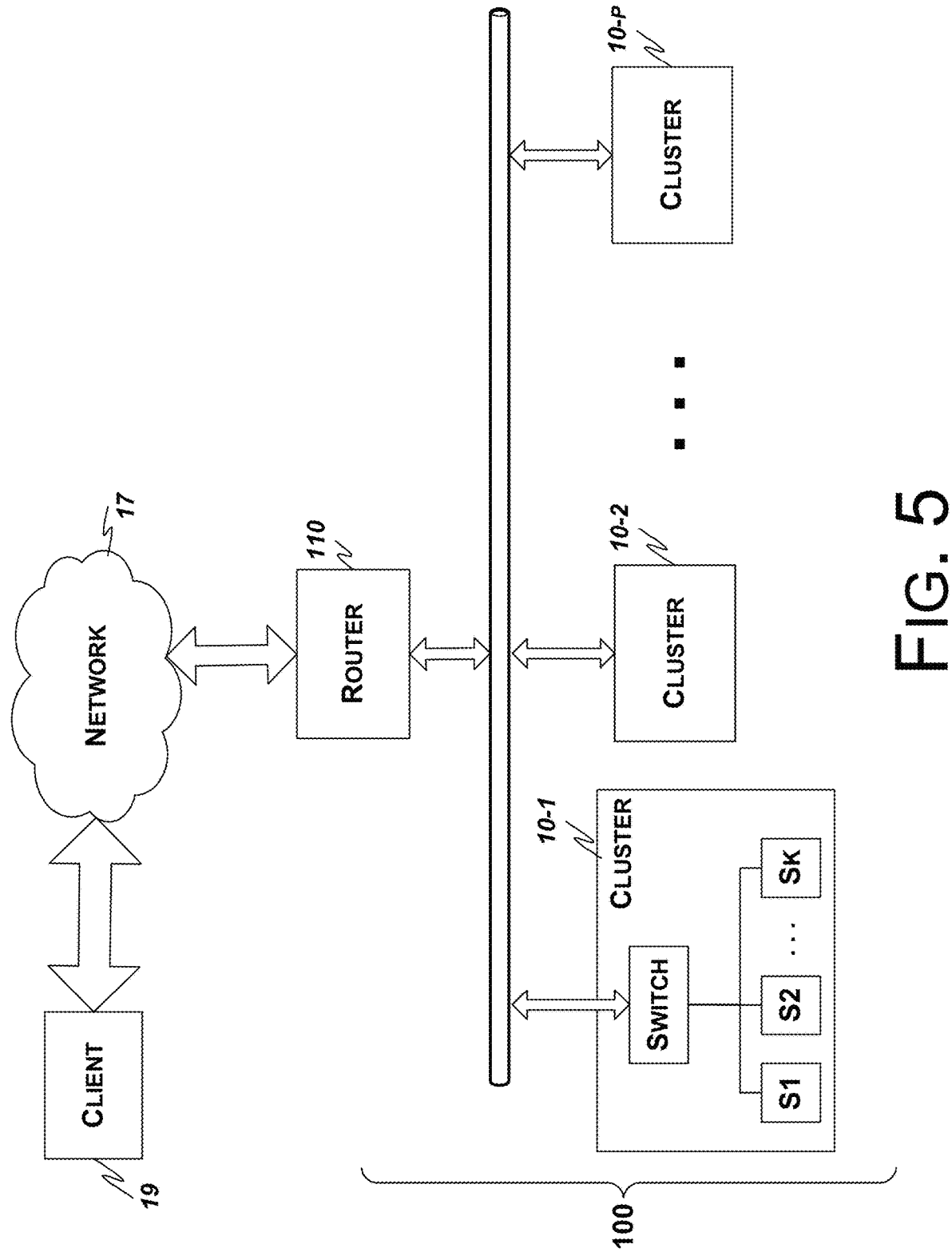
FIG. 5 depicts a collection of load-balancing clusters.

As shown in FIG. 5, a collection of load-balancing clusters 10-1, 10-2, . . . , 10-p, may be combined. Each cluster 10-j has one or more corresponding VIPs (VIP-j), so that requests for a server at the IP address VIP-k (for some value of k) will be directed (by router 110) to the appropriate cluster for handling by one of the cluster members. The router 110 may be, e.g., a load balancing router.

A client 19 may request a resource and be directed by a server selector system (e.g., DNS or the like) to a cluster. The server selector returns an IP address that happens to be a VIP address. The client then requests the resource from the VIP and, as described above, is connected (during a TCP connection) to a particular cluster member to handle the request.

If the cluster implements the partitioning function, then the connection may be handed off to another cluster member.

Figure 6A:
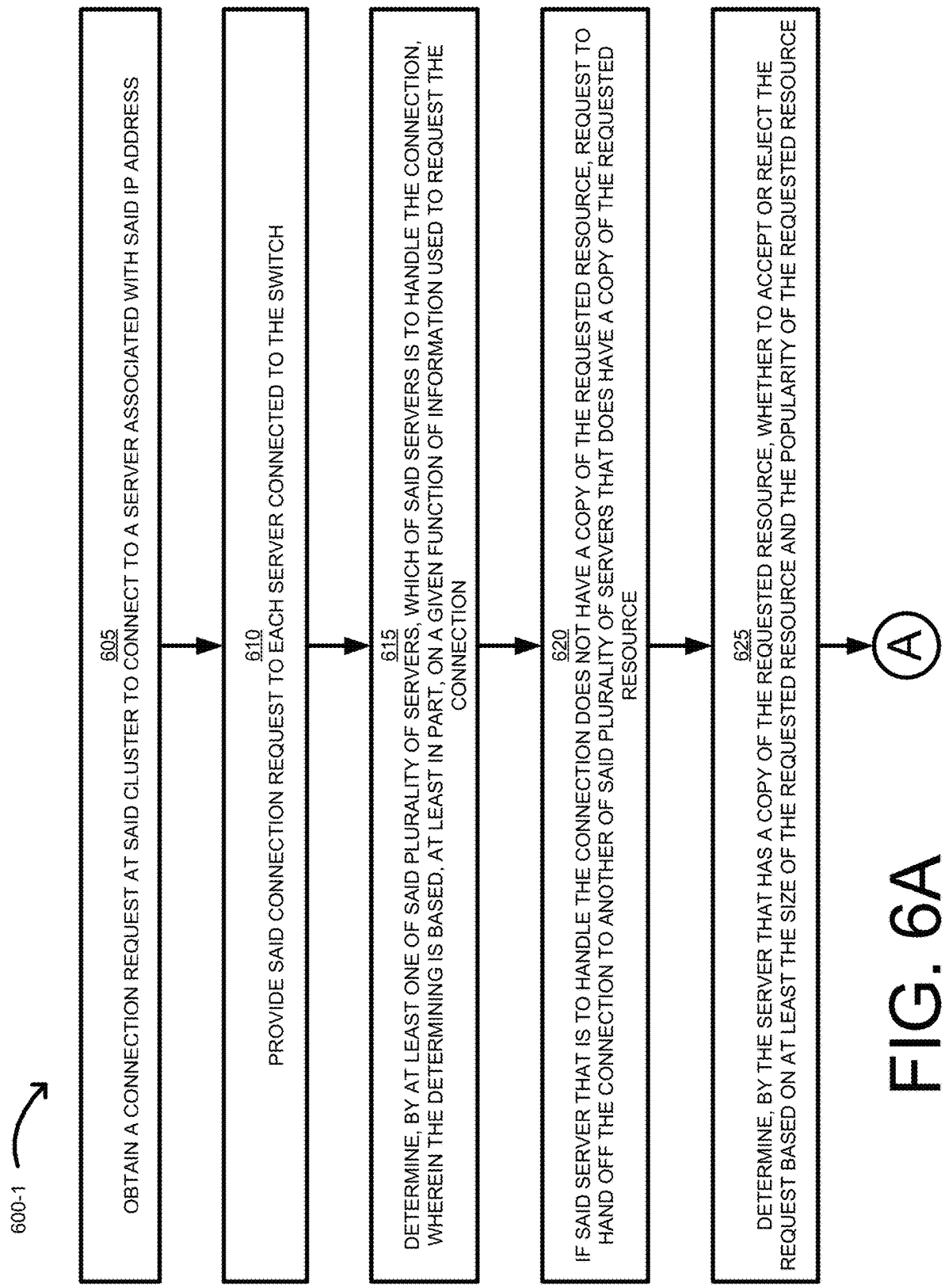
FIGS. 6A-6B are flowcharts of processing associated with server interactions.
Figure 6B:

FIG. 6 (6A and 6B) is a flowchart (600-1 and 600-2) of processing steps associated with server interactions.

In step 605, the cluster (i.e., via a switch) obtains a connection request to connect to a server associated with the virtual IP address (i.e., any server sitting behind the switch associated with a virtual IP address).

In step 610, the cluster (i.e., via the switch) provides the connection request to each server connected to the switch.

In step 615, at least one of the plurality of servers connected to the switch determines which of the plurality of servers should handle the connection. Such a determination can be based, for example, on a given function of information used to request the connection.

In step 620, if the server that is determined to handle the request does not have a copy of the requested resource, that server then requests to hand-off the connection (i.e., TCP connection) to at least one other of the plurality of servers that does have a copy of the requested resource. Note that the server may request a copy of the requested resource (e.g., via a peer-fill request) from another server that has a copy of the resource instead of sending a hand-off request.

In step 625, the server that has a copy of the requested resource determines whether to accept or reject the hand-off request (or reject or accept the peer-fill request) from the server that was originally determined to handle the connection/request. This determination can be based, for example, on the size of the requested resource, the popularity of the requested resource, as well as other attributes that are suitable for determining whether or not a TCP hand-off should occur in a server cluster in response to a request for certain resources.

In step 630, the server that has the copy of the requested resource accepts the hand-off request (or rejects the peer-fill request) if the size of the requested resource value exceeds a threshold value. In this example embodiment, if the size of the requested resource is determined to be too large (i.e., exceeds a threshold value) for expending precious system and network resource (i.e., by providing intra-cluster copies of resources, for example, one server sending a copy of a resource to another server in the cluster), then the server with the requested resource will handle the request itself (i.e., serve the requested resources, and, for example, not honor the peer-fill request).

In step 635, the server that has the copy of the requested resource accepts the hand-off request (or rejects the peer-fill request) if the popularity of the requested resource does not exceed a popularity threshold value. In other words, if it determined that the requested content is not popular (i.e., the number of times the particular resource has been requested during a retrospective time period does not exceed a threshold value), then the server with the copy of the request resource handles the connection and serves the resource (and, for example, does not honor the peer-fill request). Since the resource is not yet deemed popular, it is likely that the resource will not be requested as often and therefore is would not be efficient to transfer copies of the resource to other servers in the cluster.

In step 640, the server that has the copy of the requested resource rejects the hand-off request (or accepts/honors the peer-fill request if a copy of the resource is available) if the popularity of the requested resource exceeds the popularity threshold value. In this example circumstance, since it is determined that the requested content is popular, then it further behooves the cluster to have copies of the requested resource on other servers in the cluster to handle the possibility of more requests for the popular resource. Thus, instead of accepting the hand-off request, the server with the copy of the requested resource rejects the request, which, in one embodiment, forces the requesting server to obtain and serve the requested resource itself (and, thus, maintain a copy of the popular resource, for example, by honoring the peer-fill request and thus providing a copy of the requested resource).

In step 645, the server that has the copy of the requested resource rejects the hand-off request (or accepts/honors the peer-fill request if a copy of the resource is available) if the popularity of the requested resource exceeds the popularity threshold value and the size of the requested resource exceeds the threshold size value. This particular step elucidates the significance of popular content. Even if the size of the requested resource is deemed to large to send an intra-cluster copy from one server to another server within the same cluster (i.e., in light of the expenditure to system and network resources within the cluster), the popularity of the content may still make it more efficient in the long run to distribute a copy (or copies) of the requested resource throughout the cluster in anticipation of more requests for the popular content at the cluster. For example, one way to distribute copies of the requested resource is to reject the hand-off request and (either directly or indirectly) force the originally-selected server to handle the connection and ultimately serve the requested resource.

Figure 7:
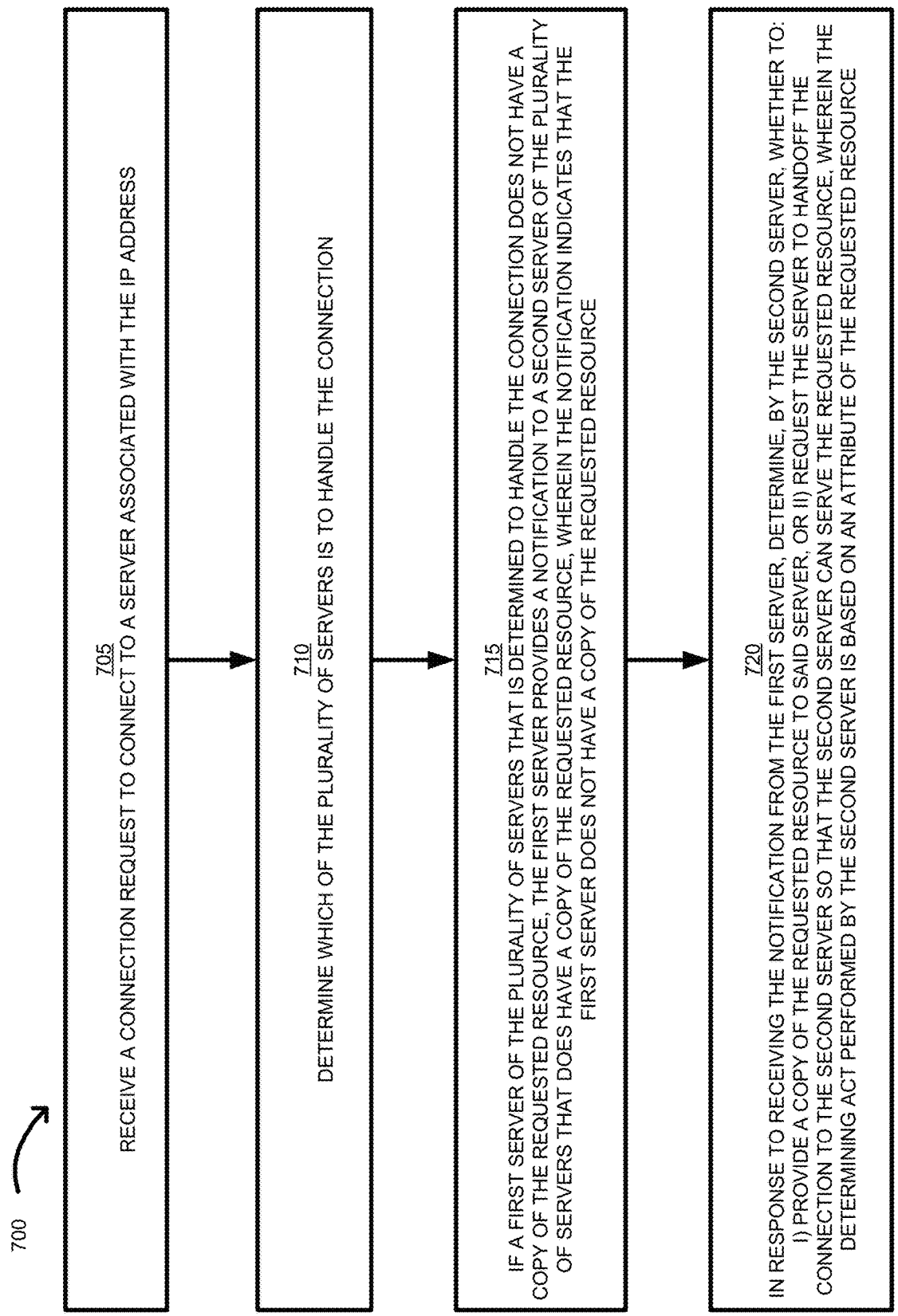
FIG. 7 is a flowchart of processing associated with server interactions.

FIG. 7 is a flowchart 700 of processing steps associated with server interactions.

In step 705, a connection request to connect to a server associated with the IP address is received (e.g., at a cluster comprising a switch and plurality of server connected thereto via one or more ports of the switch).

In step 710, a determination is made as to which of the plurality servers is to handle the connection (e.g., via a hash function).

In step 720, if a first server of the plurality of servers is determined to be the server to handle the connection (e.g., via the hash function), and the first server does not have a copy of the requested resource, the first server provides a notification to a second server of the plurality of servers that does have a copy of the requested resource. In one example embodiment, the notification indicates that the first server does not have a copy of the requested resource. Alternatively, the notification can include a hand-off request to hand-off the connection to another server (e.g., the second server in this step), and/or a peer-fill request that requests a copy of the requested resource from another server (e.g., the second server in this step).

In step 725, in response to receiving the notification from the first server, the second sever determines whether to: i) provide a copy of the requested resource to said server (e.g., reject a hand-off request or accept a peer-fill request if a copy of the requested resource is available), or ii) request the server to handoff the connection to the second server so that the second server can serve the requested resource (e.g., accept a hand-off request or reject a peer-fill request). For example, in one embodiment this determining may be based on an attribute of the requested resource (e.g., size, popularity, etc.).

Although aspects of this invention have been described with reference to a particular system, the present invention operates on any computer system and can be implemented in software, hardware or any combination thereof. When implemented fully or partially in software, the invention can reside, permanently or temporarily, on any memory or storage medium, including but not limited to a RAM, a ROM, a disk, an ASIC, a PROM and the like.

While certain configurations of structures have been illustrated for the purposes of presenting the basic structures of the present invention, one of ordinary skill in the art will appreciate that other variations are possible which would still fall within the scope of the appended claims. While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method, operable in a load-balancing cluster comprising:
    (i) a switch having a plurality of ports; and
    (ii) a cluster of servers comprising a plurality of servers connected to at least some of the plurality of ports of the switch, each of said servers being addressable by the same virtual Internet Protocol (VIP) address, the method comprising:
    (A) receiving a connection request at said switch to connect a client computer to a server associated with said VIP address;
    (B) a first server of the plurality of servers establishing a Transmission Control Protocol (TCP) connection with the client computer;
    (C) after establishing the TCP connection with the client computer in (D), and in response to a resource request received by said first server from said client computer for a particular resource, said first server determining whether or not to attempt to handoff the request to a second server of said plurality of servers based on the particular resource availability on the first server;
    (D) based on said determining in (C), said first server attempting a first handoff to handoff the TCP connection with the client computer to the second server when said first server determines that the particular resource is unavailable on the first server;
    (E) said second server rejecting said first server's attempted first handoff of the TCP connection based, at least in part, on a popularity value associated with the particular resource;
    (F) said first server obtaining the particular resource from the second server and serving the particular resource to the client in response to the popularity value associated with the particular resource exceeding a threshold popularity value and in response to said second server rejecting said first server's attempted first handoff of the TCP connection;
    (G) said first server updating a firewall of said first server to allow incoming traffic at said first server related to said TCP connection; and
    (H) other servers of said plurality of servers each updating a corresponding firewall thereof to reject incoming traffic related to said TCP connection between the client computer and the first server.

2. The method of claim 1 wherein said resource request for the particular resource comprises an HTTP request from said client computer for said particular resource.

3. The method of claim 2 wherein said information associated with the resource request for the particular resource comprises at least some information from at least one HTTP header associated with the resource request.

4. The method of claim 1 wherein said determining whether or not to attempt to handoff the request to the second server in (E) is based, at least in part, on whether said second server had already handled a previous request from said client computer for said particular resource.

5. The method of claim 1 wherein said determining whether or not to attempt to handoff the request to the second server in (E) is based, at least in part, on whether said second server had previously served said particular resource.

6. The method of claim 1 wherein said determining whether or not to attempt to handoff the request to the second server in (E) is based, at least in part, on whether said second server had previously served any resource to the client computer.

7. The method of claim 1 wherein said determining in (C) is based at least in part on a second given function of said at least some information associated with the resource request for the particular resource.

8. The method of claim 7 wherein said second given function comprises a hash function.

9. A load-balancing cluster comprising:
    (i) a switch having a plurality of ports; and
    (ii) a cluster of servers comprising a plurality of servers connected to at least some of the plurality of ports of the switch, each of said servers being addressable by the same virtual Internet Protocol (VIP) address, wherein,
    said switch is operable to receive a connection request at said switch to connect a client computer to a server associated with said VIP address;
    a first server is operable to:
        establish a Transmission Control Protocol (TCP) connection with the client computer;
        after establishing the TCP connection with the client computer, and in response to a resource request received by said first server from said client computer for a particular resource, determine whether or not to attempt to handoff the request to a second server of said plurality of servers;
        attempt to handoff the TCP connection with the client computer to the second server when said first server determines that it should attempt to handoff the request to the second server;

said second server operable to:

reject said first server's attempted handoff of the TCP connection based, at least in part, on a load on said second server; and, serve the particular resource to the client through said first server;

said first server is further operable to update a firewall of said first server to allow incoming traffic at said first server related to said TCP connection; and other servers of said plurality of servers are operable to update a corresponding firewall thereof to reject incoming traffic related to said TCP connection between the client computer and the first server.

10. The load-balancing cluster of claim 9 wherein said resource request for the particular resource comprises an HTTP request from said client computer for said particular resource.

11. The load-balancing cluster of claim 10 wherein said information associated with the resource request for the particular resource comprises at least some information from at least one HTTP header associated with the resource request.

12. The load-balancing cluster of claim 9 wherein said determining by the first server whether or not to attempt to handoff the request to the second server is based, at least in part, on whether said second server had already handled a previous request from said client computer for said particular resource.

13. The load-balancing cluster of claim 9 wherein said determining by the first server whether or not to attempt to handoff the request to the second server is based, at least in part, on whether said second server had previously served said particular resource.

14. The load-balancing cluster of claim 9 wherein said determining by the first server whether or not to attempt to handoff the request to the second server is based, at least in part, on whether said second server had previously served any resource to the client computer.

15. The load-balancing cluster of claim 9 wherein said determining by the at least some of said plurality of servers is based at least in part on a second given function of said at least some information associated with the resource request for the particular resource.

16. The load-balancing cluster of claim 15 wherein said second given function comprises a hash function.

* * * * *